US012629861B2

(12) United States Patent
Li et al.

(10) Patent No.: US 12,629,861 B2
(45) Date of Patent: May 19, 2026

(54) HANDHELD CUTTING TOOL

(71) Applicant: Nanjing Chervon Industry Co., Ltd., Nanjing (CN)

(72) Inventors: Yang Li, Nanjing (CN); Zhaodi Ou, Nanjing (CN); Haoyu Wang, Nanjing (CN); Bing Yuan, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 263 days.

(21) Appl. No.: 18/356,283

(22) Filed: Jul. 21, 2023

(65) Prior Publication Data

US 2024/0058982 A1 Feb. 22, 2024

(30) Foreign Application Priority Data

Aug. 18, 2022 (CN) ......................... 202210990728.8
Aug. 18, 2022 (CN) ......................... 202210992905.6
Aug. 18, 2022 (CN) ......................... 202222174393.0
Aug. 18, 2022 (CN) ......................... 202222179207.2

(51) Int. Cl.
*B27G 19/00* (2006.01)
*B27B 17/00* (2006.01)
*B27B 17/02* (2006.01)

(52) U.S. Cl.
CPC ........ *B27G 19/003* (2013.01); *B27B 17/0008* (2013.01); *B27B 17/02* (2013.01)

(58) Field of Classification Search
None
See application file for complete search history.

(56) References Cited

U.S. PATENT DOCUMENTS 3,042,087 A * 7/1962 Otoupalik .............. B23Q 13/00 30/151
4,369,575 A * 1/1983 Schurman .............. B25H 3/006 206/349
4,841,641 A * 6/1989 Laidlaw ............... B27G 19/003 30/382
7,284,333 B2 * 10/2007 Lawler ................. B27G 19/003 30/382
8,813,374 B2 * 8/2014 Lank ....................... B27B 17/00 30/296.1

(Continued)

FOREIGN PATENT DOCUMENTS

CN 201217206 Y 4/2009
CN 101918183 B 6/2013

(Continued)

*Primary Examiner* — Hwei-Siu C Payer
(74) *Attorney, Agent, or Firm* — Greenberg Traurig, LLP

(57) ABSTRACT

A handheld cutting tool includes a housing, a motor, a saw chain, a guide plate, and a blade sheath, where the motor is supported by the housing, the saw chain is driven by the motor to perform a cutting function, an end of the guide plate is supported by the housing and the guide plate is used for supporting and guiding the saw chain, and the blade sheath is formed with or connected to the first limiting portion, the housing or the guide plate is formed with a second limiting portion, and the first limiting portion and the second limiting portion are adaptable to each other so that the blade sheath is not separated from the handheld cutting tool at least under the action of gravity.

11 Claims, 8 Drawing Sheets

(56) References Cited

U.S. PATENT DOCUMENTS

| | | | | |
|---|---|---|---|---|
| 2001/0025423 | A1* | 10/2001 | Paquin | B27B 17/02 30/382 |
| 2006/0248734 | A1* | 11/2006 | Lawler | B27G 19/003 30/382 |
| 2013/0305545 | A1* | 11/2013 | Schell | B27G 19/003 30/286 |
| 2018/0133818 | A1* | 5/2018 | Mang | B23D 57/023 |
| 2022/0072732 | A1* | 3/2022 | Schlosser | B23D 57/023 |
| 2023/0321738 | A1* | 10/2023 | Li | B27G 19/003 83/78 |
| 2023/0405861 | A1* | 12/2023 | Niiyama | B25F 5/02 |
| 2024/0058982 | A1* | 2/2024 | Li | B27B 17/02 |

FOREIGN PATENT DOCUMENTS

| | | | |
|---|---|---|---|
| CN | 114425799 | A | 5/2022 |
| CN | 217889721 | U | 11/2022 |
| WO | 2018010699 | A1 | 1/2018 |

* cited by examiner

HANDHELD CUTTING TOOL

RELATED APPLICATION INFORMATION

This application claims the benefit under 35 U.S.C. § 119(a) of Chinese Patent Application No. 202210990728.8, filed on Aug. 18, 2022, Chinese Patent Application No. 202210992905.6, filed on Aug. 18, 2022, Chinese Patent Application No. 202222179207.2, filed on Aug. 18, 2022, and Chinese Patent Application No. 202222174393.0, filed on Aug. 18, 2022. All of these applications are incorporated herein by reference in their entirety.

BACKGROUND

A handheld cutting tool is mainly used for cutting wood. When a chain saw is not used, the saw chain of the chain saw is exposed to be prone to scratch other items, or the saw chain of the chain saw is prone to be damaged by an external environment. In the related art, the chain saw is provided with a blade sheath sleeved on the saw chain.

SUMMARY

In one example, a handheld cutting tool includes: a housing; a motor supported by the housing; a saw chain driven by the motor to perform a cutting function; a guide plate, where an end of the guide plate is supported by the housing and the guide plate is used for supporting and guiding the saw chain; and a blade sheath, where the blade sheath is formed with or connected to a first limiting portion, the housing or the guide plate is formed with a second limiting portion, and the first limiting portion and the second limiting portion are adaptable to each other so that the blade sheath is not separated from the handheld cutting tool at least under the action of gravity.

In one example, the housing includes at least a movable shield and a main housing portion, where an end of the movable shield is rotatably connected to the main housing portion and disposed above at least part of the saw chain.

In one example, the movable shield is formed with or connected to a second limiting portion, and the inside of the blade sheath is formed with or connected to the first limiting portion adapted to the second limiting portion.

In one example, the first limiting portion includes at least one first protrusion, and the second limiting portion includes at least one second protrusion, where when the blade sheath is mounted to the handheld cutting tool, the first protrusion and the second protrusion abut against each other to be used for fixing the blade sheath to the movable shield.

In one example, the blade sheath and the movable shield are made of a plastic material, and the first protrusion and the second protrusion are elastically deformable.

In one example, the second limiting portion is formed on the guide plate, the inside of the blade sheath is formed with or connected to the first limiting portion, and the blade sheath is capable of being fixed to the guide plate by the first limiting portion and the second limiting portion.

In one example, the first limiting portion is a first protrusion, the second limiting portion is a through hole, and the first protrusion is capable of being disposed in the through hole.

In one example, the inside of the blade sheath is formed with or connected to the first limiting portion, the front end of the housing is formed with or connected to the second limiting portion, and the blade sheath is capable of being fixed to the housing by the first limiting portion and the second limiting portion.

In one example, the first limiting portion includes at least one first protrusion, and the second limiting portion includes at least one second protrusion, where when the blade sheath is mounted to the handheld cutting tool, the first protrusion and the second protrusion abut against each other to be used for fixing the blade sheath to the housing.

In one example, a metal sheet is disposed at the end of the movable shield facing away from the housing, and the metal sheet is disposed on the inner side of the movable shield and opposite to the saw chain.

In one example, a power supply device is further included and used for providing electrical energy for the handheld cutting tool.

In one example, the power supply device includes at least one battery pack detachably mounted to the housing.

In one example, the main housing portion is formed with or connected to a motor housing portion, and the motor housing portion is formed with or connected to a handle.

In one example, a coupling portion is formed at or connected to the end of the handle facing away from the motor housing portion, and the power supply device is detachably connected to the coupling portion along the direction of a first straight line.

In one example, the included angle $\alpha$ between a projection of a first straight line on a reference plane where a cutting plane is located and a projection of a first axis on the reference plane where the cutting plane is located is greater than or equal to 0° and less than or equal to 40°.

A handheld cutting tool includes a tool body, and the tool body includes: a housing; a motor supported by the housing; a saw chain driven by the motor to perform a cutting function; a guide plate, where an end of the guide plate is supported by the housing and the guide plate is used for supporting and guiding the saw chain; and a blade sheath, where the blade sheath is formed with or connected to a first limiting portion, and the first limiting portion is adaptable to the tool body so that the blade sheath is not separated from the tool body at least under the action of gravity.

In one example, the tool body is formed with or connected to a second limiting portion, and the second limiting portion is disposed on the housing or the guide plate.

In one example, the housing comprises at least a movable shield and a main housing portion, where an end of the movable shield is rotatably connected to the main housing portion and disposed above at least part of the saw chain.

In one example, the second limiting portion is disposed on the movable shield.

In one example, a metal sheet is disposed at the end of the movable shield facing away from the housing, and the metal sheet is disposed on the inner side of the movable shield and opposite to the saw chain.

DETAILED DESCRIPTION

To make solved technical problems, adopted technical solutions, and achieved technical effects of the present application more apparent, the technical solutions in examples of the present application are further described in detail below in conjunction with drawings. The examples described below are only part, not all, of the examples of the present application. Based on the examples of the present application, all other examples obtained by those skilled in the art without creative work are within the scope of the present application.

In the description of the present application, the terms "joined", "connected", and "fixed" are to be understood in a broad sense unless otherwise expressly specified and limited. For example, the term "connected" may refer to "fixedly connected", "detachably connected", or integrated, may refer to "mechanically connected" or "electrically connected", or may refer to "connected directly", "connected indirectly through an intermediary", "connected inside two elements", or "interaction relations between two elements". For those of ordinary skill in the art, specific meanings of the preceding terms in the present application may be understood based on specific situations.

In the present application, unless otherwise expressly specified and limited, when a first feature is described as "on" or "below" a second feature, the first feature and the second feature may be in direct contact or be in contact via another feature between the two features instead of being in direct contact. Moreover, when the first feature is described as "on", "above", or "over" the second feature, the first feature is right on, above, or over the second feature or the first feature is obliquely on, above, or over the second feature, or the first feature is simply at a higher level than the second feature. When the first feature is described as "under", "below", or "underneath" the second feature, the first feature is right under, below, or underneath the second feature or the first feature is obliquely under, below, or underneath the second feature, or the first feature is simply at a lower level than the second feature.

Figure 1:
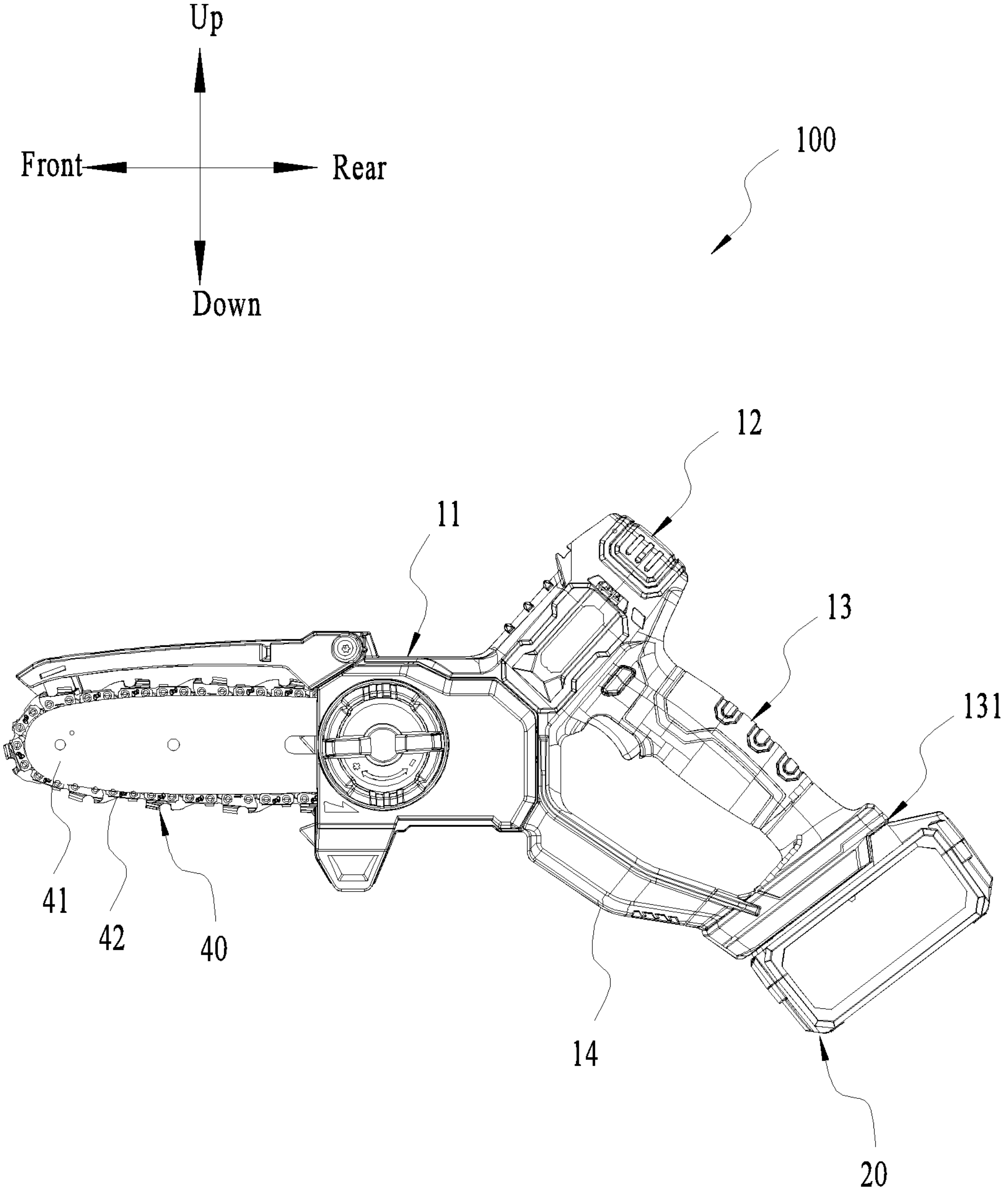
FIG. 1 is a plan view of a handheld cutting tool in a horizontal cutting state according to an example of the present application.
Figure 2:
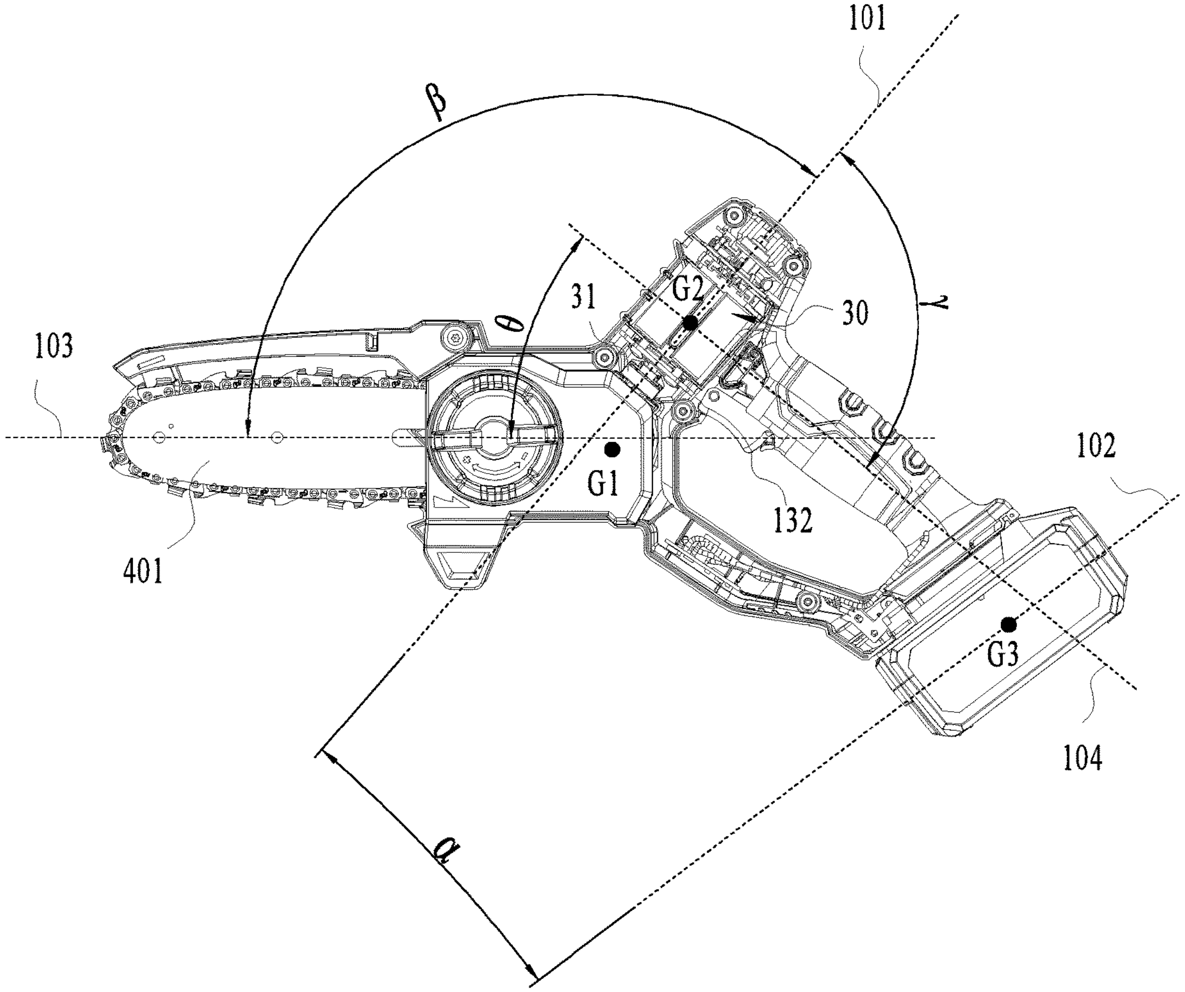
FIG. 2 is a plan view of the handheld cutting tool in FIG. 1 when part of a housing is removed.

As shown in FIG. 1 and FIG. 2, this example provides a handheld cutting tool 100, which is specifically a chain saw. The handheld cutting tool includes a main housing portion 11 formed with or connected to a motor housing portion 12, and the motor housing portion 12 is formed with or connected to a handle 13. The handle 13 is configured to be held by an operator, and a power supply device 20 is detachably connected at an end of the handle 13 and provides electrical energy for the handheld cutting tool 100. The motor housing portion 12 supports a motor 30 drivingly connected to a cutting device 40 and rotating about a first axis 101 to drive the cutting device 40 to work. The cutting device 40 is supported by the main housing portion 11 and at least partially extends in a cutting plane 401. The first axis 101 is basically parallel to the cutting plane 401 so that the center of gravity of the whole handheld cutting tool 100 is more ergonomic and the handheld cutting tool is used more comfortably.

A coupling portion 131 is formed at or connected to the end of the handle 13 facing away from the motor 30. The coupling portion 131 is used for supporting the power supply device 20 and providing a mounting position for the power supply device 20. Specifically, the power supply device 20 is a battery pack. The battery pack is detachably connected to the coupling portion 131, which facilitates the detachment and replacement of the battery pack so as to prolong the working duration of the handheld cutting tool 100.

The handheld cutting tool 100 further includes a fixed shield 14, where one end of the fixed shield 14 is connected to the main housing portion 11 or the motor housing portion 12, and the other end of the fixed shield 14 is connected to the coupling portion 131 and located below the handle 13. A space is formed between the fixed shield 14 and the handle 13 for the operator to hold the handle 13 with a hand. In addition, when the operator holds the handle 13 and the handheld cutting tool 100 works to vibrate, the fixed shield 14 can still perform a limiting function to prevent the operator's hand from easily separating from the handle 13, thereby improving the use safety of the handheld cutting tool 100.

Optionally, the coupling portion 131 extends from the end connected to the handle 13 to a side of the fixed shield 14 and is connected to the other end of the fixed shield 14. Thus, the space between the fixed shield 14 and the handle 13 is a large D-shaped space, which facilitates the hold of the operator.

The handheld cutting tool 100 provided by this example is specifically the chain saw. The cutting device 40 is constituted by a guide plate 41 and a saw chain 42 around the guide plate 41. Several L-shaped blades are spaced on the saw chain 42, and the saw chain 42 rotates around the guide plate 41, thereby driving the L-shaped blades to perform linear motion to cut wood.

The motor 30 outputs power to drive the saw chain 42 to perform the linear motion along the circumferential direction of the guide plate 41. Specifically, the output end of the motor 30 is drivingly connected to the input end of a transmission assembly, the output end of the transmission assembly is connected to the saw chain 42, and the saw chain 42 is driven, through the transmission assembly, by the power outputted by the motor 30 to perform the linear motion along the circumferential direction of the guide plate 41.

Optionally, the transmission assembly is a worm gear transmission assembly, and the end of a worm connected to the motor 30 is rotatably fixed in the motor housing portion 12 or the main housing portion 11 by a bearing 31.

Because the motor 30 rotates at a high speed, the bearing 31 connected to the worm generates much heat. Therefore, to prolong the service life of the bearing 31, a heat dissipation structure for dissipating the heat of the bearing 31 is provided so as to reduce the temperature of the bearing 31 in time.

Specifically, a rib for fixing the outer ring of the bearing 31 is disposed in the motor housing portion 12 or the main housing portion 11. The rib half wraps the outer ring of the bearing 31 so that a heat dissipation space is provided for the bearing 31. A heat dissipation air duct is disposed on the fixed shield 14. One end of the heat dissipation air duct communicates with an external environment. The other end of the heat dissipation air duct communicates with the mounting position of the bearing 31. Cold air in the external environment may flow to the position of the bearing 31 via the heat dissipation air duct, thereby reducing the temperature of the bearing 31.

The output power of the handheld cutting tool 100 is power which drives the cutting device 40 to work. The output power of the handheld cutting tool 100 provided by this example is greater than or equal to 350 W. Since the output power is high, cutting power is sufficient when some relatively thick wood is cut, which solves the problem in the related art that the handheld cutting tool 100 cannot cut thick wood and makes up a deficiency in the existing art.

The output power of the handheld cutting tool 100 is the output power of the motor 30. Specifically, the average power of the motor 30 is greater than or equal to 400 W and less than or equal to 550 W. The output power is high so that the handheld cutting tool 100 has the sufficient cutting power.

In some examples, the average power of the motor 30 is greater than or equal to 420 W and less than or equal to 530 W. For example, the average power of the motor 30 may be any of 420 W, 430 W, 440 W, 450 W, 460 W, 470 W, 480 W, 490 W, 500 W, 510 W, 520 W, and 530 W.

In some examples, the average power of the motor 30 is greater than or equal to 450 W and less than or equal to 500 W. For example, the average power of the motor 30 may be any of 450 W, 460 W, 470 W, 480 W, 490 W, and 500 W.

Instantaneous power of the motor 30 is greater than or equal to 650 W and less than or equal to 800 W.

In some examples, the instantaneous power of the motor 30 is greater than or equal to 680 W and less than or equal to 770 W. For example, the instantaneous power of the motor 30 may be any of 680 W, 690 W, 700 W, 710 W, 720 W, 730 W, 740 W, 750 W, 760 W, and 770 W.

In some examples, the instantaneous power of the motor 30 is greater than or equal to 700 W and less than or equal to 750 W. For example, the instantaneous power of the motor 30 may be any of 700 W, 710 W, 720 W, 730 W, 740 W, and 750 W.

The weight of the handheld cutting tool 100 is less than or equal to 1.8 kg. The light handheld cutting tool 100 is convenient for the operator to hold so that an operation burden of the operator is reduced and it is not easy to cause fatigue during long-time operation.

The ratio of the maximum output power of the motor 30 to the weight of the handheld cutting tool 100 is lower than or equal to 3 W/kg and higher than or equal to 8 W/kg. The working power of the handheld cutting tool 100 is increased and the weight of the handheld cutting tool 100 is reduced, thereby reducing the load of the operator when working. Optionally, the ratio of the maximum output power of the motor 30 to the weight of the handheld cutting tool 100 is lower than or equal to 4 W/kg and higher than or equal to 7 W/kg. For example, the ratio of the maximum output power of the motor 30 to the weight of the handheld cutting tool 100 may be any of 4 W/kg, 5 W/kg, 6 W/kg, and 7 W/kg.

The weight of the motor 30 is greater than or equal to 0.2 kg and less than or equal to 0.4 kg. For example, the weight of the motor 30 may be any of 0.2 kg, 0.25 kg, 0.3 kg, 0.35 kg, and 0.4 kg. The selected motor 30 meets the foregoing requirement on output power, and the light motor 30 is selected so that the overall weight of the handheld cutting tool 100 is reduced.

The diameter of the motor 30 is larger than or equal to 38 mm and smaller than or equal to 46 mm. The motor 30 of a proper volume is selected so that the structural compactness of the handheld cutting tool 100 is improved.

Optionally, the diameter of the motor 30 is larger than or equal to 39 mm and smaller than or equal to 45 mm. For example, the diameter of the motor 30 may be any of 39 mm, 40 mm, 41 mm, 42 mm, 43 mm, 44 mm, and 45 mm.

In some examples, the diameter of the motor 30 is larger than or equal to 41 mm and smaller than or equal to 43 mm. For example, the diameter of the motor 30 may be any of 41 mm, 41.5 mm, 42 mm, 42.5 mm, and 43 mm.

In this example, the ratio of the maximum output power of the motor 30 to the volume of the motor 30 is higher than or equal to 4.4 $W/cm^3$ and lower than or equal to 5.6 $W/cm^3$.

In some examples, the ratio of the maximum output power of the motor 30 to the volume of the motor 30 is lower than or equal to 4.6 $W/cm^3$ and higher than or equal to 5.4 $W/cm^3$. For example, the ratio of the maximum output power of the motor 30 to the volume of the motor 30 is any of 4.6 $W/cm^3$, 4.7 $W/cm^3$, 4.8 $W/cm^3$, 4.9 $W/cm^3$, 5 $W/cm^3$, 5.1 $W/cm^3$, 5.2 $W/cm^3$, 5.3 $W/cm^3$, and 5.4 $W/cm^3$.

In some examples, the ratio of the maximum output power of the motor 30 to the volume of the motor 30 is lower than or equal to 4.8 $W/cm^3$ and higher than or equal to 5.2 $W/cm^3$. For example, the ratio of the maximum output power of the motor 30 to the volume of the motor 30 is any of 4.8 $W/cm^3$, 4.9 $W/cm^3$, 5 $W/cm^3$, 5.1 $W/cm^3$, and 5.2 $W/cm^3$.

The power supply device 20 provides the electrical energy for the handheld cutting tool 100. In this example, the weight of the power supply device 20 is greater than or equal to 0.3 kg and less than or equal to 0.7 kg. While a power supply requirement is met, the weight of the power supply device 20 is reduced, thereby further reducing the weight of the handheld cutting tool 100.

In some examples, the weight of the power supply device 20 is greater than or equal to 0.4 kg and less than or equal to 0.6 kg. For example, the weight of the power supply device 20 is any of 0.4 kg, 0.45 kg, 0.5 kg, 0.55 kg, and 0.6 kg.

In order that the power supply requirement of the handheld cutting tool 100 is met, the rated voltage of the power supply device 20 is lower than or equal to 20 V, and the total energy of the power supply device 20 is greater than or equal to 40 Wh and less than or equal to 80 Wh.

In some examples, the total energy of the power supply device 20 is greater than or equal to 45 Wh and less than or equal to 75 Wh. For example, the total energy of the power supply device 20 may be any of 45 Wh, 50 Wh, 55 Wh, 60 Wh, 65 Wh, 70 Wh, and 75 Wh.

In some examples, the total energy of the power supply device 20 is greater than or equal to 55 Wh and less than or equal to 65 Wh. For example, the total energy of the power supply device 20 may be any of 55 Wh, 56 Wh, 57 Wh, 58 Wh, 59 Wh, 60 Wh, 61 Wh, 62 Wh, 63 Wh, 64 Wh, and 65 Wh.

The handheld cutting tool 100 provided by this example has high power, a light weight, a small volume, and high cutting efficiency so that a user has a good hand feeling.

The power supply device 20 is at least connected to the motor 30 to provide the electrical energy for the motor 30. The power supply device 20 is detachably connected to the coupling portion 131 along the direction of a first straight line 102. The coupling portion 131 supports the mounting of the power supply device 20. The power supply device 20 and the coupling portion 131 are detachably connected to each other, which facilitates the replacement of the power supply device 20 so as to prolong the service life of the handheld cutting tool 100.

The included angle $\alpha$ between a projection of the preceding first straight line 102 on the reference plane where the cutting plane 401 is located and a projection of the first axis 101 on the reference plane where the cutting plane 401 is located is greater than or equal to 0° and less than or equal to 40° so that the power supply device 20 is conveniently plugged, which is ergonomic and makes the overall balance of the handheld cutting tool 100 good.

The included angle α between the projection of the first straight line 102 on the reference plane where the cutting plane 401 is located and the projection of the first axis 101 on the reference plane where the cutting plane 401 is located is greater than or equal to 0° and less than or equal to 30° so that the overall balance of the handheld cutting tool 100 is further improved on the premise that the motor 30 and the power supply device 20 are conveniently arranged. For example, the included angle between the projection of the first straight line 102 on the reference plane where the cutting plane 401 is located and the projection of the first axis 101 on the reference plane where the cutting plane 401 is located may be any of 0°, 5°, 10°, 15°, 20°, 25°, and 30°. When the included angle α between the projection of the first straight line 102 on the reference plane where the cutting plane 401 is located and the projection of the first axis 101 on the reference plane where the cutting plane 401 is located is closer to 0° or even is 0°, the insertion direction of the power supply device 20 is nearly parallel to or is parallel to the rotation axis of the motor 30. After the power supply device 20 is mounted on the handheld cutting tool 100, the whole handheld cutting tool 100 stands vertically on a horizontal working surface through the power supply device 20. In addition, because of the good overall balance of the handheld cutting tool 100, the handheld cutting tool 100 will not topple over when placed upright.

The guide plate 41 is supported by the main housing portion 11 and extends along the direction of a second straight line 103.

In this example, the included angle β between the projection of the first axis 101 on the reference plane where the cutting plane 401 is located and a projection of the second straight line 103 on the reference plane where the cutting plane 401 is located is greater than or equal to 110° and less than or equal to 135°, thereby further improving the overall balance of the handheld cutting tool 100.

In some examples, the included angle β between the projection of the first axis 101 on the reference plane where the cutting plane 401 is located and the projection of the second straight line 103 on the reference plane where the cutting plane 401 is located is greater than or equal to 120° and less than or equal to 130°. For example, the included angle β between the projection of the first axis 101 on the reference plane where the cutting plane 401 is located and the projection of the second straight line 103 on the reference plane where the cutting plane 401 is located may be any of 120°, 121°, 122°, 123°, 124°, 125°, 126°, 127°, 128°, 129°, and 130°.

In this example, the handle 13 extends along the direction of a third straight line 104, and the included angle γ between a projection of the third straight line 104 on the reference plane where the cutting plane 401 is located and the projection of the first axis 101 on the reference plane where the cutting plane 401 is located is greater than or equal to 60° and less than or equal to 90°. In the operation scenario in which the handheld cutting tool 100 needs to be lifted, the center of gravity of the handheld cutting tool 100 is perpendicular to an arm and is downward so that a force arm length on the arm is reduced and a burden on the arm is reduced when a lift and a hold are performed.

Optionally, the included angle γ between the projection of the third straight line 104 on the reference plane where the cutting plane 401 is located and the projection of the first axis 101 on the reference plane where the cutting plane 401 is located is greater than or equal to 70° and less than or equal to 90°. For example, the included angle γ between the projection of the third straight line 104 on the reference plane where the cutting plane 401 is located and the projection of the first axis 101 on the reference plane where the cutting plane 401 is located may be any of 70°, 72°, 74°, 76°, 78°, 80°, 82°, 84°, 86°, 88°, and 90°. If the included angle γ between the projection of the third straight line 104 on the reference plane where the cutting plane 401 is located and the projection of the first axis 101 on the reference plane where the cutting plane 401 is located is closer to 90° or is 90°, the burden on the arm of the operator performing the lift and the hold is lighter.

Further, the included angle θ between the projection of the third straight line 104 on the reference plane where the cutting plane 401 is located and the projection of the second straight line 103 on the reference plane where the cutting plane 401 is located is greater than or equal to 30° and less than or equal to 50° so that the burden on the arm of the operator performing the lift and the hold is reduced. The angle θ is set so that the positional relationship between the cutting device 40 and the handle 13 is limited. The angle θ cooperates with the included angle γ between the projection of the third straight line 104 on the reference plane where the cutting plane 401 is located and the projection of the first axis 101 on the reference plane where the cutting plane 401 is located so that the positional relationship among the cutting device 40, the handle 13, and the motor 30 is limited.

Optionally, the included angle θ between the projection of the third straight line 104 on the reference plane where the cutting plane 401 is located and the projection of the second straight line 103 on the reference plane where the cutting plane 401 is located is greater than or equal to 35° and less than or equal to 45°. For example, the included angle θ between the projection of the third straight line 104 on the reference plane where the cutting plane 401 is located and the projection of the second straight line 103 on the reference plane where the cutting plane 401 is located may be any of 35°, 36°, 37°, 38°, 39°, 40°, 41°, 42°, 43°, 44°, and 45°.

In this example, a trigger 132 for the user to operate is connected to the end of the handle 13 facing the motor housing portion 12. A projection of the trigger 132 on a plane perpendicular to an up and down direction is completely within a projection of the motor 30 on the plane perpendicular to the up and down direction, thereby improving the overall aesthetics of the handheld cutting tool 100. In addition, when the handheld cutting tool 100 is used for a cut, the middle finger and the purlicue of a human hand may be used as main force-bearing parts. Thus, the handheld cutting tool 100 can be better controlled.

As shown in FIG. 2, when a horizontal cut is performed by the handheld cutting tool 100, the center of gravity of the handheld cutting tool 100 is G1, the center of gravity of the motor 30 is G2, and the center of gravity of the power supply device 20 is G3. On a plane perpendicular to a front and rear direction, the center G1 of gravity is between the center G2 of gravity and the center G3 of gravity. When the handheld cutting tool 100 is used for performing the horizontal cut and a vertical cut, a better holding effect and a better hand feeling about the cuts are provided for the operator.

Figure 3:
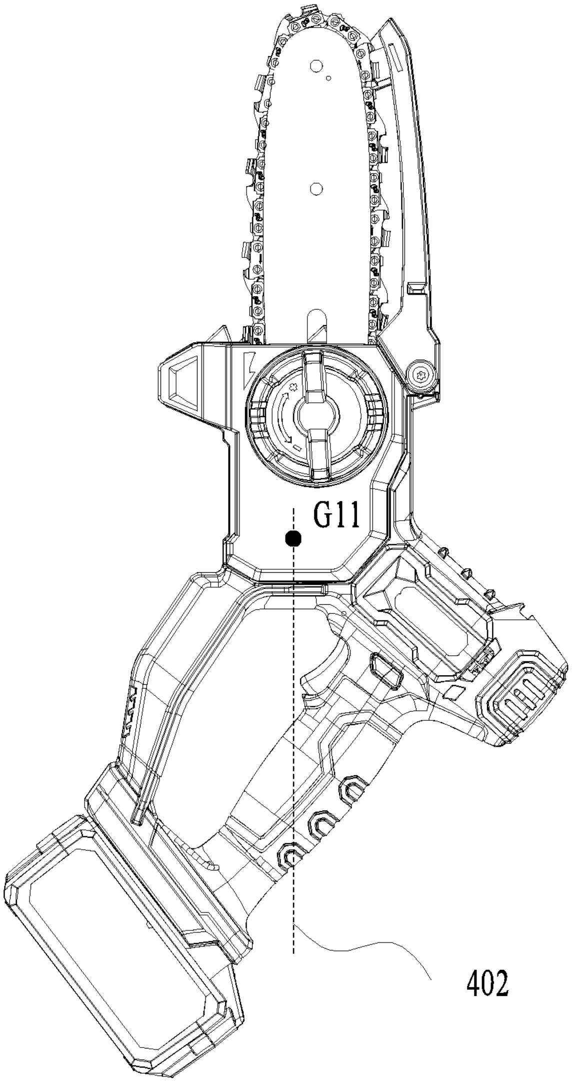
FIG. 3 is a plan view of the handheld cutting tool in FIG. 1 in a vertical cutting state

Referring to FIG. 3, when the vertical cut is performed by the handheld cutting tool 100, the center G11 of gravity of the handheld cutting tool 100 is on a first plane 402 perpendicular to the up and down direction. The first plane 402 intersects with the handle 13. The up and down direction refers to the up and down direction of the handheld cutting tool 100 in FIG. 2 when placed horizontally. When the vertical cut is performed by the handheld cutting tool 100, the center of the handheld cutting tool 100 is near the holding portion of the handle 13, thereby further improving the effect with which the operator holds the handle 13 and improving the hand feeling about the cut.

Figure 8:
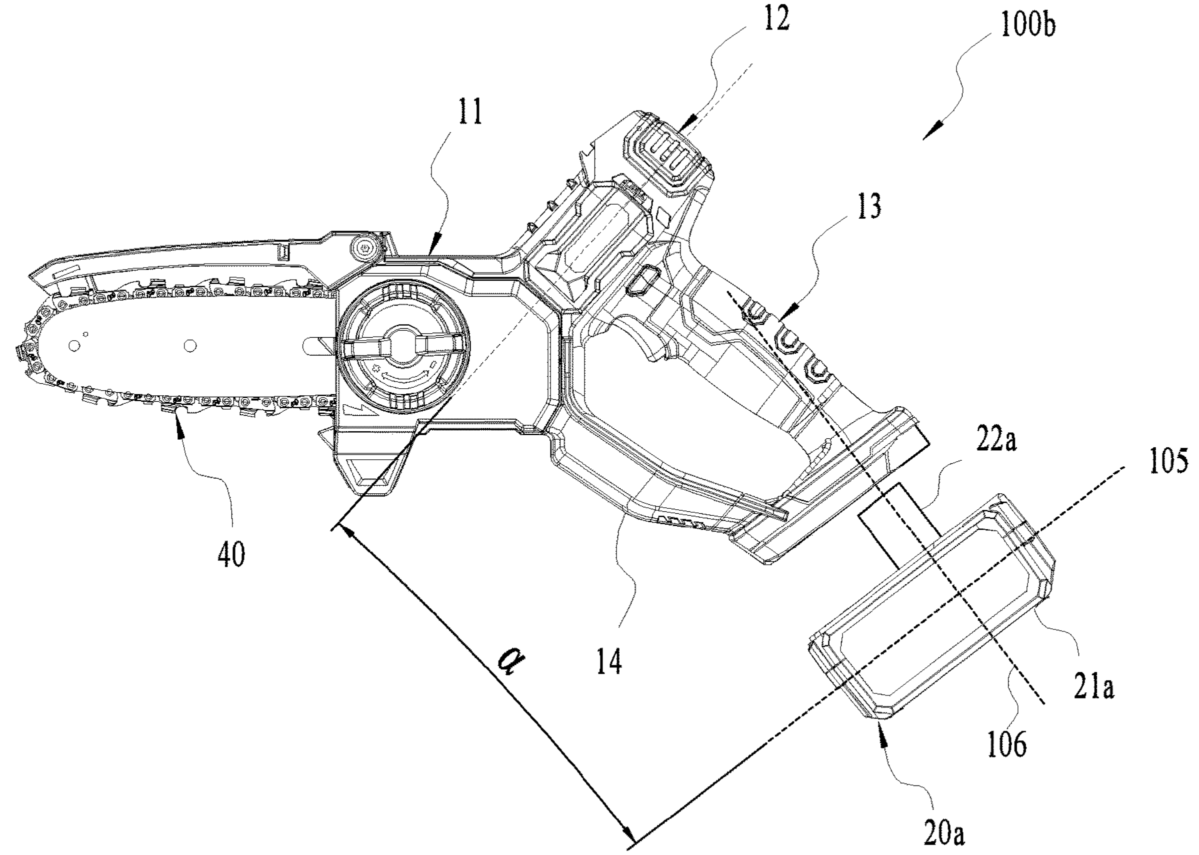
FIG. 8 is an exploded view a handheld cutting tool according to an example of the present application.

As shown in FIG. 8, this example provides a handheld cutting tool 100*b*, which is specifically a chain saw. The handheld cutting tool 100*b* has the same main housing portion 11, the motor 30, the cutting device 40, and the like as the handheld cutting tool 100 in FIG. 1. In this example, the same parts of the present example and the handheld cutting tool 100 in FIG. 1 use the same labels. Components such as the motor 30 are not shown or labeled in FIG. 8, and the structure of the handheld cutting tool 100 applicable to the handheld cutting tool 100*b* of this example is not described in detail, and the same labels are used if they are involved.

The main difference between this example and the handheld cutting tool 100 in FIG. 1 is that the handheld cutting tool 100*b* includes a power supply device 20*a* at least connected to the motor 30 to provide the electrical energy for the motor 30. The power supply device 20*a* is mounted on the handle 13 and detachably connected to the handle 13. Specifically, the coupling portion 131 is formed at or connected to the end of the handle 13 facing away from the motor housing portion 12, and the power supply device 20*a* is connected to the coupling portion 131 so that the power supply device 20*a* is at least electrically connected to the motor 30 to provide the electrical energy for the motor 30. The coupling portion 131 supports the mounting of the power supply device 20*a*. The power supply device 20*a* and the coupling portion 131 are detachably connected to each other, which facilitates the replacement of the power supply device 20*a* so as to prolong the service life of the handheld cutting tool 100.

The power supply device 20*a* includes a body portion 21*a* extending approximately along a fourth straight line 105. The included angle α between a projection of the fourth straight line 105 on the reference plane where the cutting plane 401 is located and the projection of the first axis 101 on the reference plane where the cutting plane 401 is located is greater than or equal to 0° and less than or equal to 40° so that the handheld cutting tool 100 has the good overall balance.

In this example, the included angle α between the projection of the fourth straight line 105 on the reference plane where the cutting plane 401 is located and the projection of the first axis 101 on the reference plane where the cutting plane 401 is located is greater than or equal to 0° and less than or equal to 30° so that the overall balance of the handheld cutting tool 100 is further improved on the premise that the motor 30 and the power supply device 20*a* are conveniently arranged. For example, the included angle between the projection of the fourth straight line 105 on the reference plane where the cutting plane 401 is located and the projection of the first axis 101 on the reference plane where the cutting plane 401 is located may be any of 0°, 5°, 10°, 15°, 20°, 25°, and 30°. When the included angle α between the projection of the fourth straight line 105 on the reference plane where the cutting plane 401 is located and the projection of the first axis 101 on the reference plane where the cutting plane 401 is located is closer to 0° or even is 0°, the insertion direction of the power supply device 20*a* is nearly parallel to or is parallel to the rotation axis of the motor 30. After the power supply device 20*a* is mounted on the handheld cutting tool 100, the whole handheld cutting tool 100 stands vertically on the horizontal working surface through the power supply device 20*a*. In addition, because of the good overall balance of the handheld cutting tool 100, the handheld cutting tool 100 will not topple over when placed upright.

In this example, the power supply device 20*a* further includes a first portion 22*a* extending from the body portion 21*a*. When the power supply device 20*a* is mounted to the handheld cutting tool 100, the first portion 22*a* is disposed in an accommodating space formed by the handle 13. The first portion 22*a* is connected to the accommodating space of the handle 13 in a pluggable manner.

The first portion 22*a* enables the power supply device 20*a* to be coupled to the handle 13 along a fifth direction 106 which is substantially the same as the extension direction of the handle 13. In some example, the angle formed between the fifth direction 106 and the extending direction of the handle 13 is less than or equal to 20 degrees.

Figure 4:
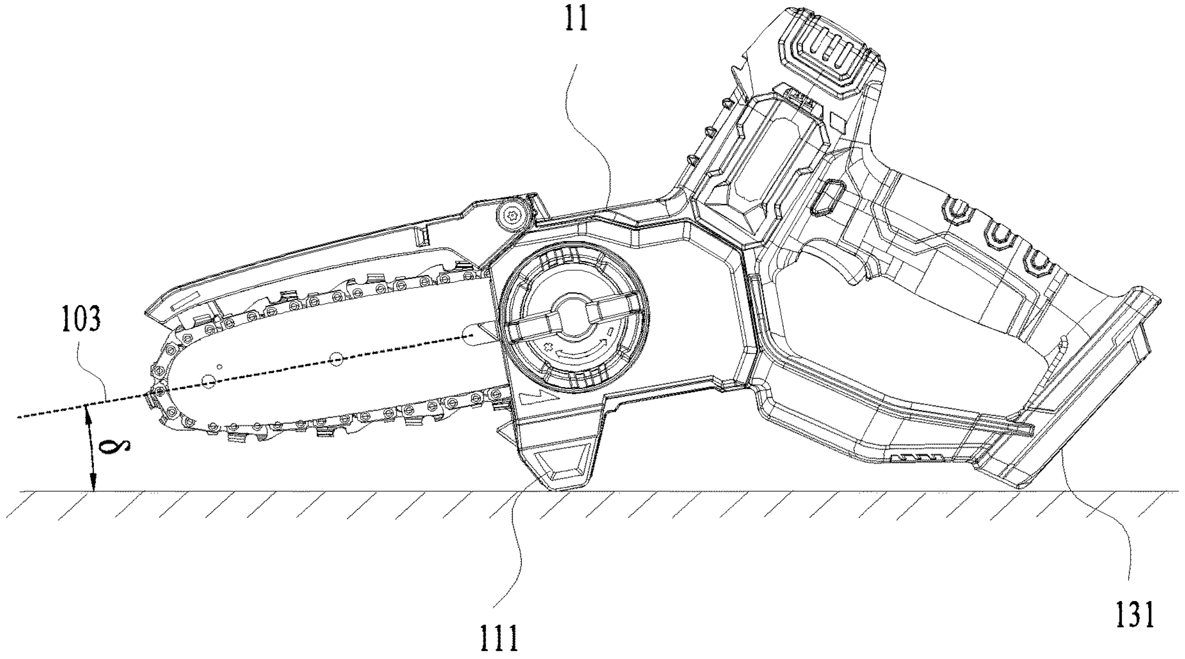
FIG. 4 is a plan view of the handheld cutting tool in FIG. 1 supported on a horizontal working surface with a power supply device removed.

As shown in FIG. 4, in this example, the main housing portion 11 is further formed with or connected to a support portion 111. When the power supply device 20 is not mounted on the handheld cutting tool 100, the handheld cutting tool 100 can be supported on the working surface by the support portion 111 and the coupling portion 131 so that the cutting device 40 of the handheld cutting tool 100 is prevented from directly touching the working surface. In addition, the handheld cutting tool 100 has two support points, and the two support points cooperate with each other so that a spacing exists between the cutting device 40 and the working surface and high support stability is achieved.

Optionally, the width of the coupling portion 131 in a left and right direction is greater than the width of the handle 13 in the left and right direction. The support area with which the coupling portion 131 is supported on the horizontal working surface is increased so that the support stability of the handheld cutting tool 100 is improved. The left and right direction refers to the left and right direction of the handheld cutting tool 100 which the operator faces when holding the handheld cutting tool 100 with the hand.

In this example, when the handheld cutting tool 100 is supported on the working surface by the support portion 111 and the coupling portion 131, the saw chain 42 does not intersect with the working surface so that the saw chain 42 is prevented from scratching the working surface.

When the handheld cutting tool 100 is supported on the working surface by the support portion 111 and the coupling portion 131, the included angle δ between the second straight line 103 and the working surface is less than or equal to 12°. If the included angle δ between the second straight line 103 and the working surface is greater than 12°, the saw chain 42 may touch the working surface, and there is a risk of damaging the working surface.

The power supply device 20 is detachable. In this example, the power supply device 20 is detachably connected to the coupling portion 131 along the direction of the first straight line 102, thereby facilitating the detachment and mounting of the power supply device 20. The coupling portion 131 supports the mounting of the power supply device 20. The power supply device 20 and the coupling portion 131 are detachably connected to each other, which facilitates the replacement of the power supply device 20 so as to prolong the service life of the handheld cutting tool 100.

In this example, the rated voltage of the power supply device 20 is lower than or equal to 12 V.

Figure 5:
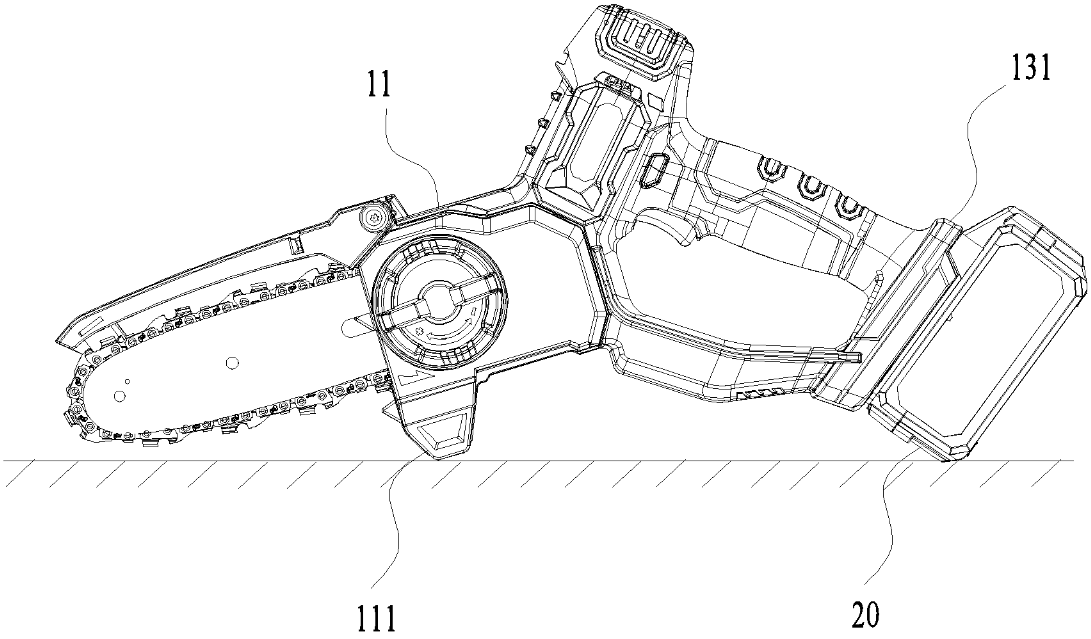
FIG. 5 is a plan view of the handheld cutting tool in FIG. 1 supported on a horizontal working surface.

As shown in FIG. 5, when the handheld cutting tool 100 is supported on the working surface by the support portion 111 and the power supply device 20, the included angle δ between the second straight line 103 and the working surface is less than or equal to 10°. If the included angle δ between the second straight line 103 and the working surface is greater than 10°, the saw chain 42 may touch the working surface, and there is the risk of damaging the working surface. In addition, the power supply device 20 is mounted on the coupling portion 131, which increases the spacing between the cutting device 40 and the working surface.

Figure 6:
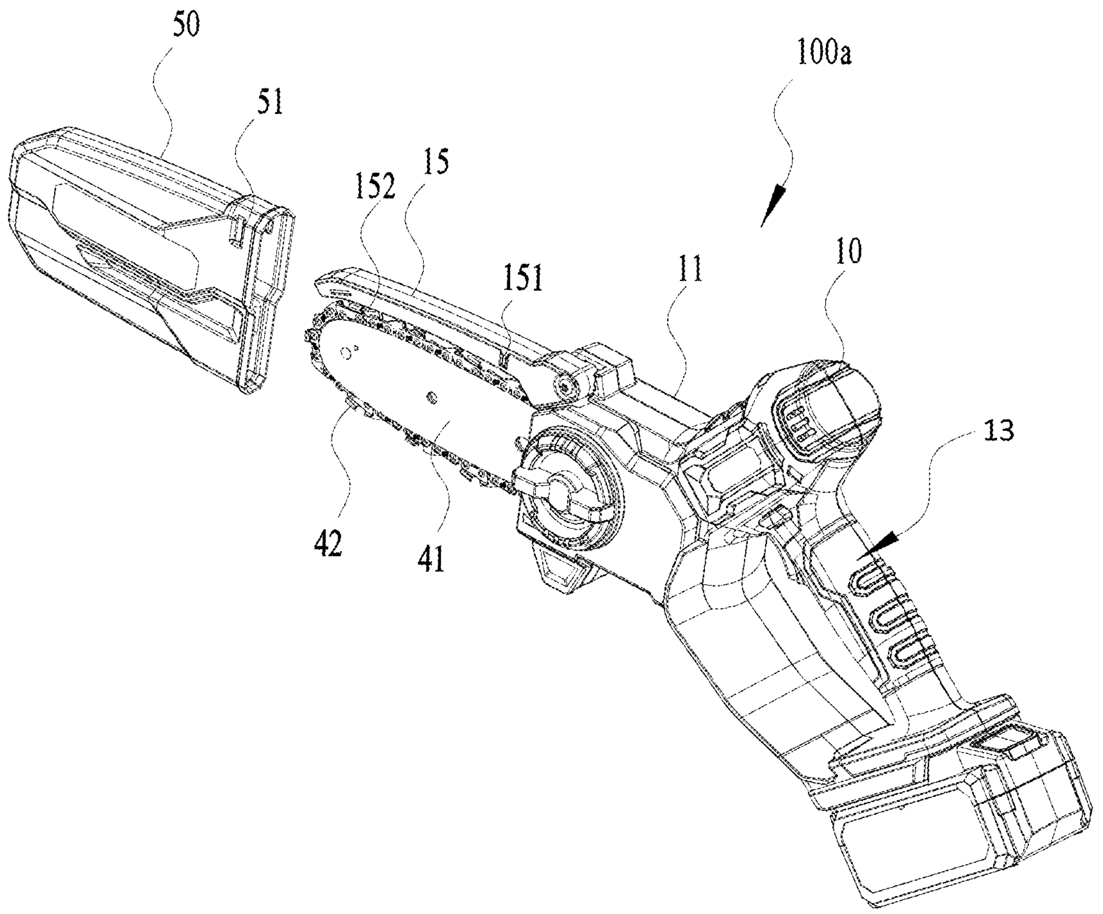
FIG. 6 is a perspective view of a handheld cutting tool and a blade sheath according to an example of the present application.

As shown in FIG. 6, this example provides a handheld cutting tool 100*a*, which is specifically a chain saw. The chain saw includes a tool body (a housing 10) and a blade sheath 50 detachably mounted to the tool body. The handheld cutting tool 100*a* has the same main housing portion 11, the motor 30, the saw chain 42, the guide plate 41, and the like as the handheld cutting tool 100 in FIG. 1. In this example, the same parts of the present example and the handheld cutting tool 100 in FIG. 1 use the same labels. Components such as the motor 30 are not shown or labeled in FIG. 8, and the structure of the handheld cutting tool 100 applicable to the handheld cutting tool 100*a* of this example is not described in detail, and the same labels are used if they are involved. The motor 30 is supported by the housing 10. The saw chain 42 is driven by the motor 30 to perform a cutting function. One end of the guide plate 41 is supported by the housing 10 and the guide plate is used for supporting and guiding the saw chain 42. The blade sheath is formed with or connected to a first limiting portion, and the first limiting portion is adaptable to the tool body so that the blade sheath is not separated from the tool body at least under the action of gravity. Optionally, the blade sheath 50 is sleeved outside the guide plate 41 and formed with or connected to the first limiting portion 51. The housing 10 is formed with a second limiting portion 151, and the first limiting portion 51 and the second limiting portion 151 are adaptable to each other so that the blade sheath 50 is not separated from the handheld cutting tool 100 at least under the action of the gravity.

In this example, the blade sheath 50 is provided. When the handheld cutting tool 100 is not used, the blade sheath 50 is sleeved on the outer side of the guide plate 41 so that the saw chain 42 is prevented from damaging other items and the saw chain 42 can also be protected from being damaged. The first limiting portion 51 and the second limiting portion 151 are adapted to each other to connect the blade sheath 50 to the housing 10 or the guide plate 41 so that the blade sheath 50 is effectively prevented from being separated from the handheld cutting tool 100.

Figure 7:
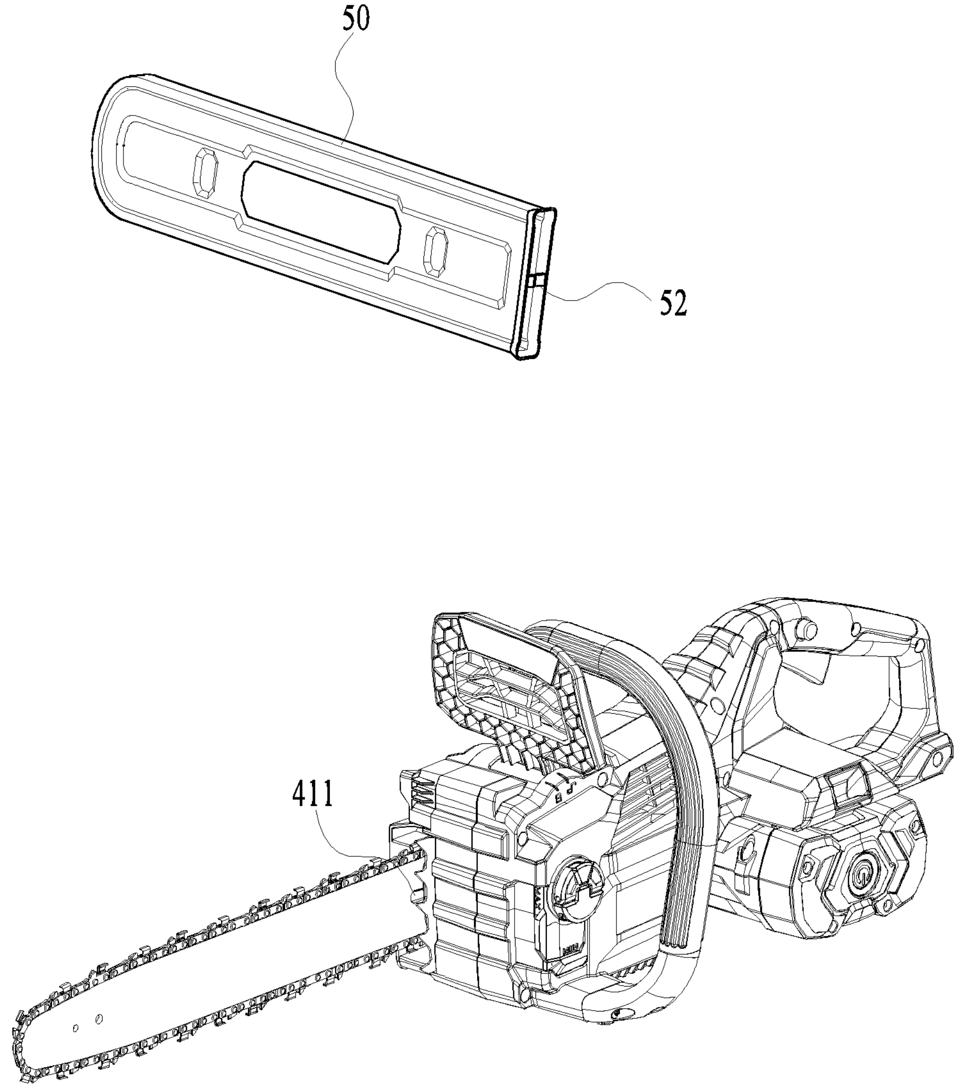
FIG. 7 is a perspective view of a handheld cutting tool and a blade sheath according to an example of the present application.

A two-hand chainsaw 100*c* using the same blade sheath 50 as in FIG. 6 is shown in FIG. 7. Referring to FIG. 7, a second limiting portion 411 is formed on the guide plate 41, the inside of the blade sheath 50 is formed with or connected to a first limiting portion 52, and the blade sheath 50 can be fixed to the guide plate 41 by the first limiting portion 52 and the second limiting portion 411 so that the blade sheath 50 is prevented from falling off. The first limiting portion 52 is a first protrusion, the second limiting portion 411 is a through hole, and the first protrusion can be disposed in the through hole. The first protrusion is elastically deformable. In the process where the blade sheath 50 is mounted, the first protrusion is squeezed. Until the first protrusion moves to the position of the through hole, the shape of the first protrusion is restored and the first protrusion is inserted into the through hole so that the object to connect the blade sheath 50 to the guide plate 41 is achieved.

The blade sheath 50 is made of an elastic material, which is optionally a plastic material. In the process where the blade sheath 50 is mounted, the blade sheath 50 is elastically deformable at the position where the blade sheath 50 has the first protrusion so that the first protrusion is insertable into the through hole.

In some other examples, referring to FIG. 6, the inside of the blade sheath 50 is formed with or connected to the first limiting portion 51, the front end of the housing 10 is formed with or connected to the second limiting portion 151, and the blade sheath 50 can be fixed to the housing 10 by the first limiting portion 51 and the second limiting portion 151 so that the blade sheath 50 is prevented from falling off.

Optionally, the first limiting portion 51 includes at least one first protrusion, and the second limiting portion 151 includes at least one second protrusion, where when the blade sheath 50 is mounted to the handheld cutting tool 100, the first protrusion and the second protrusion abut against each other to be used for fixing the blade sheath 50 to the housing 10.

The blade sheath 50 and the housing 10 are each made of the elastic material, which is optionally the plastic material. When the blade sheath 50 is mounted, the blade sheath 50 and the housing 10 are each elastically deformable so that the position of the first protrusion and the position of the second protrusion are elastically deformable to abut against each other.

In some other examples, referring to FIG. 6, the housing 10 includes at least a movable shield 15 and the main housing portion 11, where an end of the movable shield 15 is rotatably connected to the main housing portion 11 and disposed above at least part of the chain saw 42 so that cut chips are prevented from splashing, and the operator is protected from an injury.

The end of the movable shield 15 is rotatably connected to the main housing portion 11, and the other end of the movable shield 15 is a free end. Therefore, in order that the free end of the movable shield 15 is prevented from being in contact with the saw chain 42 to be abraded and the service life of the movable shield 15 is prolonged, In this example, a metal sheet 152 is disposed at the end of the movable shield 15 facing away from the housing 10, and the metal sheet 152 is disposed on the inner side of the movable shield 15 and facing toward the saw chain 42. When the handheld cutting tool 100 is subjected to a relatively large vibration, the movable shield 15 vibrates, and the metal sheet 152 is in contact with the saw chain 42 to protect the movable shield 15 from being damaged.

The movable shield 15 is formed with or connected to the second limiting portion 151, and the inside of the blade sheath 50 is formed with or connected to the first limiting portion 51 adapted to the second limiting portion 151.

The first limiting portion 51 includes the at least one first protrusion, and the second limiting portion 151 includes the at least one second protrusion, where when the blade sheath 50 is mounted to the handheld cutting tool 100, the first protrusion and the second protrusion abut against each other to be used for fixing the blade sheath 50 to the movable shield 15.

The blade sheath 50 and the movable shield 15 are each made of the elastic material, which is optionally the plastic material. When the blade sheath 50 is mounted, the blade sheath 50 and the housing 10 are each elastically deformable so that the first protrusion and the second protrusion are elastically deformable to abut against each other.

The preceding examples of the present application are merely examples for a clear description of the present application and are not intended to limit examples of the present application. For those of ordinary skill in the art, changes or alterations in other different forms may also be made based on the preceding description. All examples cannot be and do not need to be exhausted herein. Any modification, equivalent substitution, and improvement made within the spirit and principle of the present application should fall within the scope of the claims of the present application.

What is claimed is:

1. A handheld cutting tool, comprising:

a housing comprising a movable shield and a main housing portion, an end of the movable shield is rotatably coupled to the main housing portion;

a motor supported by the housing;

a saw chain driven by the motor to perform a cutting function, the end of the movable shield is disposed above at least a part of the saw chain;

a guide plate, wherein an end of the guide plate is supported by the housing, and the guide plate is used for supporting and guiding the saw chain; and a blade sheath, wherein the blade sheath is formed with or connected to a first limiting portion, a second limiting portion is formed with or connected to the movable shield, the first limiting portion and the second limiting portion are securable to each other so that the blade sheath is not separated from the handheld cutting tool at least under action of gravity of the blade sheath when the blade sheath is mounted to the handheld cutting tool, and an inside of the blade sheath is formed with or connected to the first limiting portion that is securable to the second limiting portion.

2. The handheld cutting tool according to claim 1, wherein the first limiting portion comprises a first protrusion, the second limiting portion comprises a second protrusion, and, when the blade sheath is mounted to the handheld cutting tool, the first protrusion and the second protrusion abut against each other to be used for fixing the blade sheath to the movable shield.

3. The handheld cutting tool according to claim 2, wherein the blade sheath and the movable shield are made of a plastic material, and the first protrusion and the second protrusion are elastically deformable.

4. The handheld cutting tool according to claim 1, wherein a metal sheet is disposed at an end of the movable shield facing away from the housing, and the metal sheet is disposed on an inner side of the movable shield and facing toward the saw chain.

5. The handheld cutting tool according to claim 1, further comprising a power supply device for providing electrical energy for the handheld cutting tool.

6. The handheld cutting tool according to claim 5, wherein the power supply device comprises a battery pack detachably mounted to the housing.

7. The handheld cutting tool according to claim 1, wherein the main housing portion is formed with or connected to a motor housing portion, and the motor housing portion is formed with or connected to a handle.

8. The handheld cutting tool according to claim 7, wherein a coupling portion is formed at or connected to an end of the handle facing away from the motor housing portion, and a power supply device is detachably connected to the coupling portion along a direction of a first straight line.

9. The handheld cutting tool according to claim 1, wherein the motor rotates about a first axis, an included angle $\alpha$ between a projection of a first straight line on a reference plane where a cutting plane is located and a projection of the first axis on the reference plane where the cutting plane is located is greater than or equal to 0° and less than or equal to 40°.

10. A handheld cutting tool, comprising:

a housing including a movable shield and a main housing portion, wherein an end of the movable shield is rotatably connected to the main housing portion;

a motor supported by the housing;

a blade sheath formed with or connected to a first limiting portion;

a saw chain driven by the motor to perform a cutting function, and the end of the movable shield is disposed above at least part of the saw chain, and a second limiting portion is disposed on the movable shield; and a guide plate, wherein an end of the guide plate is supported by the housing, and the guide plate is used for supporting and guiding the saw chain, wherein the first limiting portion is securable to the tool body so that the blade sheath is not separated from the housing at least under action of gravity when the blade sheath is mounted to the handheld cutting tool.

11. The handheld cutting tool according to claim 10, wherein a metal sheet is disposed at an end of the movable shield facing away from the housing, and the metal sheet is disposed on an inner side of the movable shield and facing toward the saw chain.

* * * * *